Patented Apr. 10, 1928.

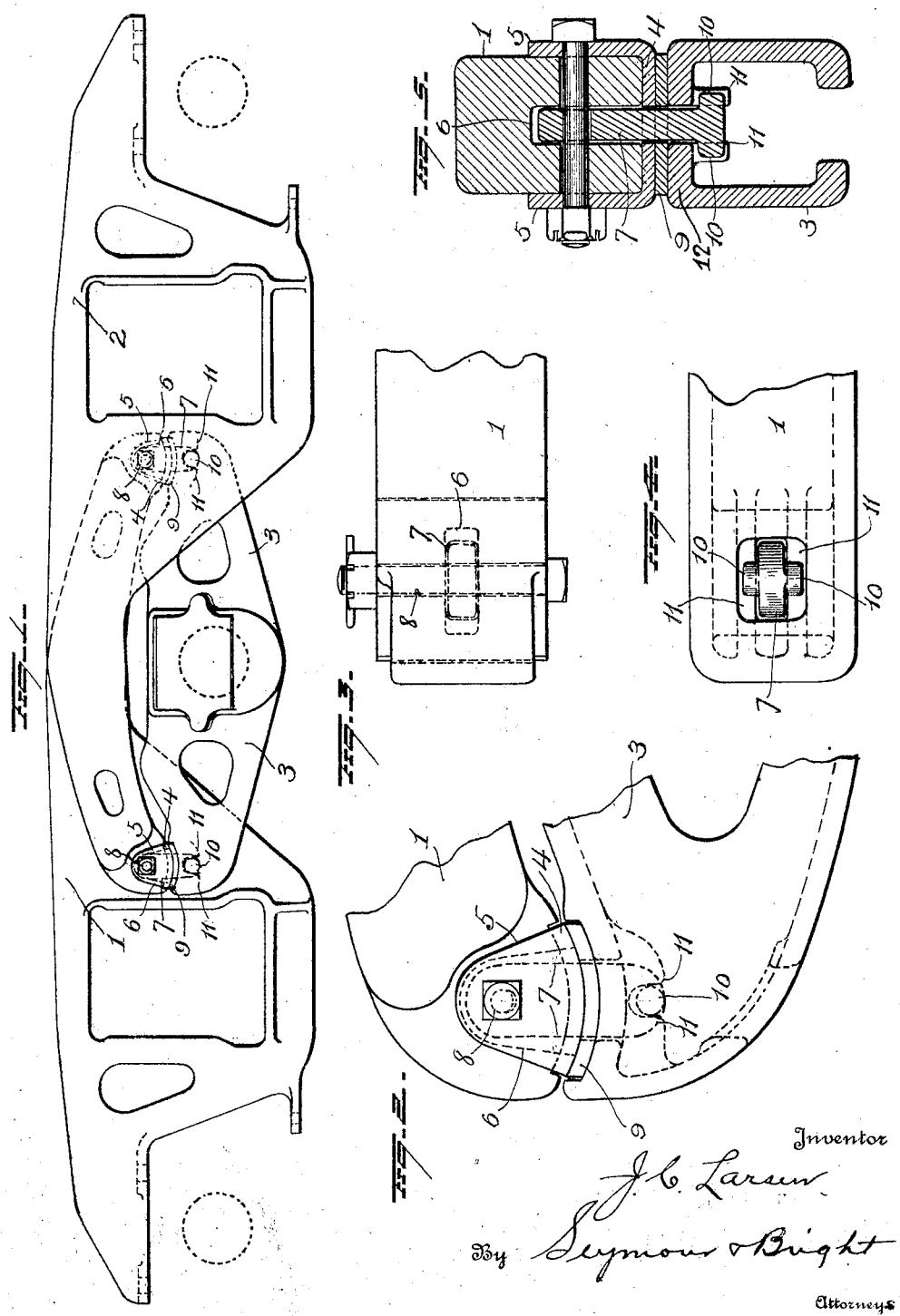

1,665,417

UNITED STATES PATENT OFFICE.

JACOB C. LARSEN, OF COLUMBUS, OHIO, ASSIGNOR TO THE BUCKEYE STEEL CASTINGS COMPANY, OF COLUMBUS, OHIO.

CAR-TRUCK CONSTRUCTION.

Application filed February 10, 1927. Serial No. 167,317.

This invention relates to improvements in car truck constructions and more particularly to wear means,—one object of the invention being to provide efficient means to compensate for wear in the connections between the central car truck construction.

With this and other objects in view, the invention consists in certain novel features of construction and combinations of parts as hereinafter set forth and pointed out in the claims.

In the accompanying drawing:

Figure 1 is a view in elevation showing an embodiment of the invention,

Figure 2 is an enlarged view showing the improved wear structure,

Figure 3 is a top plan view of the structure shown in Figure 2,

Figure 4 is a bottom plan view of the same and

Figure 5 is a sectional view.

In the drawings, the end equalizing members 1, 2 and the central equalizing member 3 of a six wheel car truck structure, are shown, the end members 1 and 2 being flexibly connected with end portions of the central member. As is customary in such equalizing constructions, the end members 1, 2 are so formed that their inner end portions will be disposed parallel with each other and connected respectively with the far ends of the central or equalizing member 3.

The inner end portion of each end member 1—2 has applied thereto, a wear plate 4 having flanges 5 to engage respective sides of the end member and the latter is formed with a socket 6 in which a link 7 is movable. A bolt 8 passes through the flanges 5, end member 1 (2) and through the upper portion of the link 7. A second wear plate 9 is disposed on the top of the central member 3 at each end thereof and engages the wear plate 4. The link 7 depends through suitably aligned holes in the wear plates 4 and 9 and through a hole in the member 3,—the lower end of said link being provided with lateral lugs 10 to engage shoulders 11 depending from the horizontal web portion 12 of the central member 3.

Having fully described my invention what I claim as new and desire to secure by Letters-Patent, is:—

1. In a car truck structure, the combination with relatively movable members, of a flanged wear plate on one of said members, a wear plate mounted on the other member, a swinging link extending from one of said members and through the wear plates and the other member, and a bolt passing through the flanges of the flanged wear plate, through the member to which it is applied and through the upper portion of said link.

2. In a car truck structure, the combination with relatively movable members, of a flanged wear plate on one of said members, the latter having a socket, a wear plate mounted on the other member, a swinging link having its upper portion located in said socket and extending from said member and through the wear plates and the other member, and a bolt passing through the flanges of the flanged wear plate, through the member to which it is applied and through the upper portion of said link.

3. In a car truck structure, the combination with relatively movable members, of a flanged wear plate on one of said members, a wear plate mounted on the other member, a swinging link extending from one of said members and through the wear plates and the other member, and a bolt passing through the flanges of the flanged wear plate, through the member to which it is applied and through the upper portion of said link, lateral lugs on the lower portion of said link and shoulders on the adjacent member in position to be engaged by said lugs.

4. In a car truck structure, the combination with end equalizing members and a central equalizing member, of a flanged wear plate on the inner end portion of each end member, a wear plate on each end portion of the central member, swinging links connecting said end and central members and passing through the wear plates and portions of the central member, and means pivotally connecting said links with end portions of the end member.

5. In a car truck structure, the combination with end equalizing members, and a central equalizing member, of a flanged wear plate on the inner end portion of each end member, a wear plate on each end portion of the central member, said end members having sockets, swinging links extending into said sockets and connecting said end and central members, and means pivotally connecting said links with end portions of the end members.

6. In a car truck structure, the combination with end equalizing members and a central equalizing member, of a flanged wear plate on the inner end portion of each end member, wear plates on end portions of the central member, said end members having sockets, swinging links extending into said sockets and connecting said end and central members, said links also passing through the wear plates, and a pivot member passing through the flanged wear plates, the end members and said links.

In testimony whereof, I have signed this specification.

JACOB C. LARSEN.